US010103959B2

(12) United States Patent
Klein

(10) Patent No.: US 10,103,959 B2
(45) Date of Patent: *Oct. 16, 2018

(54) SCALABLE SOFTWARE MONITORING INFRASTRUCTURE, USING PARALLEL TASK QUEUING, TO OPERATE IN ELASTIC CLOUD ENVIRONMENTS

(71) Applicant: International Business Machines Corporation, Armonk, NY (US)

(72) Inventor: Paul F. Klein, Newbury Park, CA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 14/149,763

(22) Filed: Jan. 7, 2014

(65) Prior Publication Data

US 2015/0195164 A1    Jul. 9, 2015

(51) Int. Cl.
G06F 15/16      (2006.01)
H04L 12/26      (2006.01)
H04L 29/08      (2006.01)
G06F 9/455      (2018.01)
G06F 8/60       (2018.01)

(52) U.S. Cl.
CPC ...... *H04L 43/0876* (2013.01); *G06F 9/45558* (2013.01); *H04L 67/02* (2013.01); *H04L 67/1002* (2013.01); *H04L 67/32* (2013.01); *G06F 8/60* (2013.01); *G06F 2009/45591* (2013.01)

(58) Field of Classification Search
CPC . H04L 43/0876; H04L 67/02; H04L 67/1002; H04L 67/32; G06F 9/45558; G06F 8/60; G06F 2009/45591
See application file for complete search history.

(56) References Cited

U.S. PATENT DOCUMENTS

| | | | |
|---|---|---|---|
| 6,980,537 B1* | 12/2005 | Liu | H04L 45/46 370/277 |
| 8,127,290 B2 | 2/2012 | Suit | |
| 8,341,263 B2* | 12/2012 | Chambers | G06F 9/5083 709/203 |
| 8,904,039 B1* | 12/2014 | Hindawi | H04L 12/6418 709/217 |
| 8,935,692 B2 | 1/2015 | Ferris | |
| 2007/0283009 A1* | 12/2007 | Takemura | H04L 43/08 709/224 |

(Continued)

OTHER PUBLICATIONS

US Patent Application, dated Aug. 26, 2015, for U.S. Appl. No. 14/836,752, filed Aug. 26, 2015, invented by Paul F. Klein, total 35 pages.

(Continued)

*Primary Examiner* — Douglas B Blair
*Assistant Examiner* — Jihad K Boustany
(74) *Attorney, Agent, or Firm* — Rabindranath Dutta; Konrad, Raynes, Davda and Victor LLP

(57) ABSTRACT

Provided are a method, a system, and a computer program product in which a plurality of cloud images that execute in a plurality of nodes are maintained by a monitoring server, in a cloud computing environment. The monitoring server maintains information on an increase and a decrease in number of the plurality of cloud images in the cloud computing environment.

17 Claims, 11 Drawing Sheets

(56) References Cited

U.S. PATENT DOCUMENTS

| | | | |
|---|---|---|---|
| 2009/0083390 A1* | 3/2009 | Abu-Ghazaleh | G06F 15/16 709/209 |
| 2009/0089410 A1* | 4/2009 | Vicente | G06F 9/45533 709/223 |
| 2010/0220622 A1* | 9/2010 | Wei | H04L 41/0896 370/252 |
| 2011/0131335 A1* | 6/2011 | Spaltro | G06F 9/5072 709/228 |
| 2011/0314465 A1 | 12/2011 | Smith et al. | |
| 2012/0030670 A1 | 6/2012 | Hurri et al. | |
| 2012/0158329 A1* | 6/2012 | Hurri | G06Q 50/06 702/62 |
| 2013/0091577 A1* | 4/2013 | McGinley | G06F 21/00 726/25 |
| 2013/0211546 A1* | 8/2013 | Lawson | G05B 19/4185 700/9 |

OTHER PUBLICATIONS

Preliminary Amendment, dated Aug. 26, 2015, for U.S. Appl. No. 14/836,752, filed Aug. 26, 2015, invented by Paul F. Klein, total 6 pages.

Lists of Related Applications, pp. 2, dated Aug. 26, 2015.

Andreolini, M., et al., "A Scalable Architecture for Real-Time Monitoring of Large Information Systems", dated 2012, 2012 IEEE Second Symposium on Network Cloud Computing and Applications, University of Modena and Reggio Emilla. Modina Italy, pp. 1-8.

Office Action, dated Jul. 5, 2016, for U.S. Appl. No. 14/836,752, filed Aug. 26, 2015, invented by Paul F. Klein, Total 16 pages.

Response to Office Action, dated Oct. 5, 2016,for U.S. Appl. No. 14/836,752, filed Aug. 26, 2015, invented by Paul F. Klein, Total 7 pages.

Final Office Action, dated Mar. 10, 2017, for U.S. Appl. No. 14/836,752, filed Aug. 26, 2015, invented by Paul F. Klein, Total 21 pages.

Response to Office Action, dated Jun. 9, 2017, for U.S. Appl. No. 14/836,752, filed Aug. 26, 2015, invented by Paul F. Klein, Total 9 pages.

Office Action, dated Sep. 22, 2017, for U.S. Appl. No. 14/836,752, filed Aug. 26, 2015, invented by Paul F. Klein, Total 14 pages.

Response to Office Action, dated Dec. 22, 2017, for U.S. Appl. No. 14/836,752, filed Aug. 26, 2015, invented by Paul F. Klein, Total 8 pages.

Notice of Allowance, dated Jun. 15, 2018, for U.S. Appl. No. 14/836,752, filed Aug. 26, 2015, invented by Paul F. Klein, Total 27 pages.

* cited by examiner

SCALABLE SOFTWARE MONITORING INFRASTRUCTURE, USING PARALLEL TASK QUEUING, TO OPERATE IN ELASTIC CLOUD ENVIRONMENTS

BACKGROUND

1. Field

Embodiments relate to a scalable software monitoring infrastructure, using parallel task queuing, to operate in elastic cloud environments.

2. Background

Current commercially available software monitoring infrastructures may be designed and scaled for computer environments that are medium in size and static in nature. Certain entities that deploy software applications may determine the maximum number of computers or computer images that are needed for a specific application, and then deploy a monitoring infrastructure of a fixed size for the purpose of software monitoring. In certain situations these monitoring infrastructures are hierarchical and form a hub-and-spoke model.

In many situations, it has been observed that hierarchical monitoring infrastructures begin to fail after monitoring more than a certain number (e.g., 30,000) of computer systems. In other words, the hierarchical monitoring infrastructures may not scale to more than a certain number (e.g., 30,000) of computer systems.

Additionally, in certain situations, such hierarchical infrastructures may also fail when the computing environment changes dynamically over a period of time, instead of remaining static over the period of time.

SUMMARY OF THE PREFERRED EMBODIMENTS

Provided are a method, a system, and a computer program product in which a plurality of cloud images that execute in a plurality of nodes are maintained by a monitoring server, in a cloud computing environment. The monitoring server maintains information on an increase and a decrease in number of the plurality of cloud images in the cloud computing environment.

In additional embodiments, a cloud image includes a signaling agent and a data collection agent. The signaling agent of the cloud image receives a request from the monitoring server to monitor one or more tasks offloaded by the monitoring server, where the one or more tasks are offloaded by the monitoring server for monitoring to the signaling agent of the cloud image.

In further embodiments, the data collection agent of the cloud image performs data collection from at least one or more of the plurality of cloud images to which the one or more tasks are offloaded.

In yet further embodiments, the monitoring server aggregates a plurality of requests for data collection and sends the plurality of requests in a single package to one or more signaling agents that execute on the plurality of cloud images.

In certain embodiments, the data collection agent in association with other data collection agents collect information in parallel on at least performance characteristics to report to a customer for the customer to allocate further tasks for execution in the cloud computing environment.

In additional embodiments, each of the plurality of cloud images is a virtual machine that executes on one or more of the plurality of nodes of the cloud computing environment, wherein one or more virtual machine execute on at least some nodes of the plurality of nodes.

In yet further embodiments, at least 30000 cloud images are maintained in the cloud computing environment subsequent to the increase in the number of the plurality of cloud images in the cloud computing environment, where the monitoring node is unable to directly monitor tasks executing on the at least 30000 cloud images, and where software monitoring by the monitoring node is scalable with the increase in the number of the plurality of cloud images.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Monitoring Infrastructure in Cloud Computing Environments

With the introduction of cloud computing, the potential of large application deployments across a significantly large number (e.g., over 30,000) of cloud images becomes increasingly more likely. Such deployments may require an extremely large fixed monitoring infrastructure.

Additionally cloud environments may be very dynamic in nature with the introduction of cloud elasticity (i.e., cloud expansion and contraction). Therefore, current fixed software monitoring infrastructures, based on static hierarchical models may fail in cloud environments.

Therefore, certain embodiments provide a form of monitoring infrastructure, based on dynamic peer-to-peer models for such elastic cloud environments, for the purpose of monitoring.

Certain embodiments avoid the hierarchical hub-and-spoke model and introduce a dynamic peer-to-peer model that can cope with monitoring the large number of computers found in cloud environments, as well as coping with cloud elasticity (i.e., the ever changing expansion and contraction of the cloud environment).

Certain embodiments provide the notion of a dynamic peer-to-peer monitoring group that discovers all the cloud images in a cloud deployment and uses these cloud images as places where monitoring tasks can be queued and run, in parallel, enabling a mechanism that may be scaled massively.

Exemplary Embodiments

Figure 1:
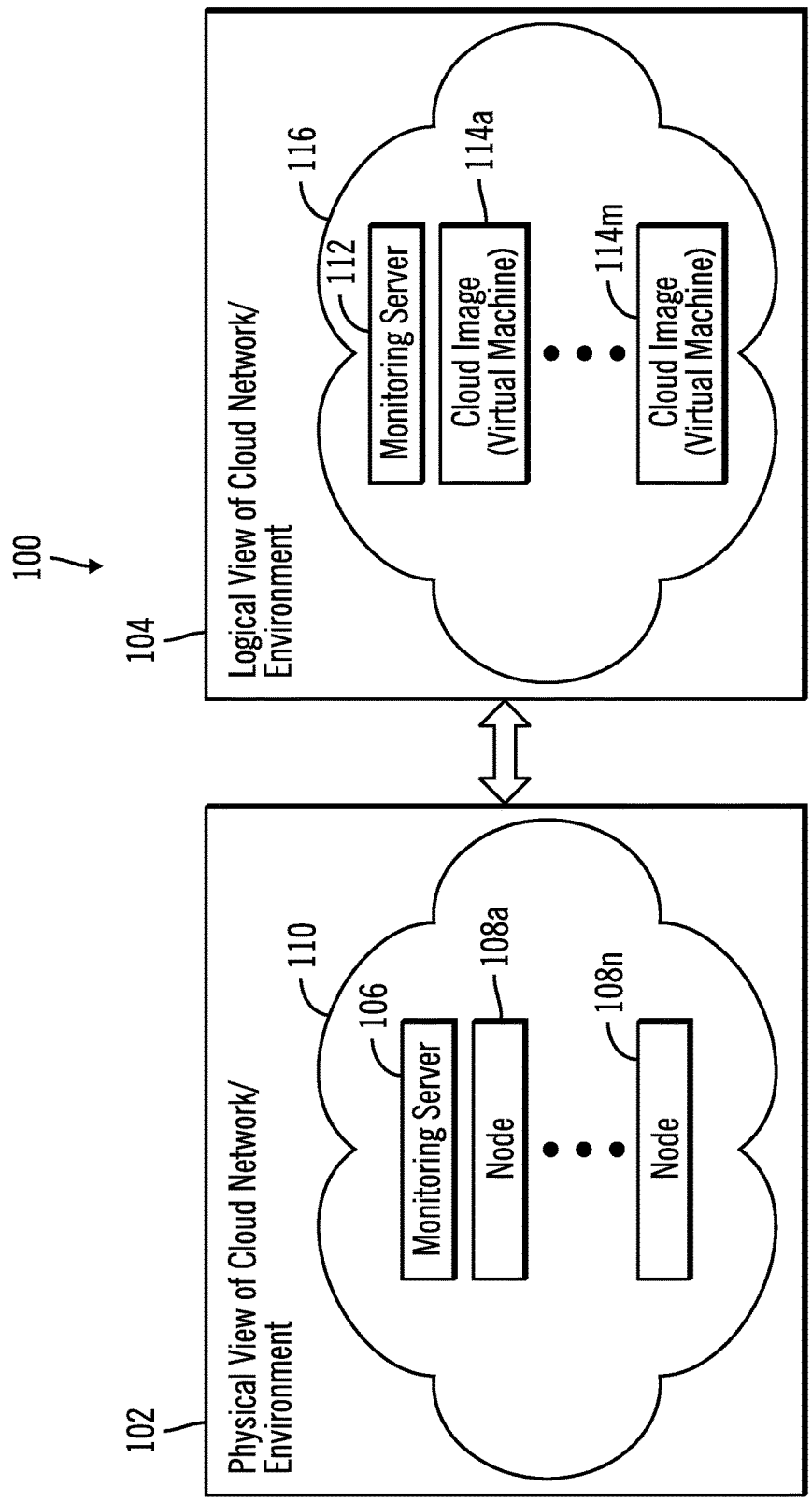
FIG. 1 illustrates a block diagram of a physical view of a cloud computing environment, and a corresponding logical view of the cloud computing environment, in accordance with certain embodiments.

FIG. 1 illustrates a block diagram 100 of a physical view 102 of a cloud computing environment and a corresponding logical view 104 of the cloud computing environment, in accordance with certain embodiments.

The physical view 102 of the cloud computing environment represents a physical configuration of a monitoring server 106 and a plurality of nodes 108a . . . 108n that are present within a cloud network 110. The monitoring server 106 and the nodes 108a . . . 108n may comprise any suitable computational device including those presently known in the art, such as, a personal computer, a workstation, a server, a mainframe, a hand held computer, a palm top computer, a telephony device, a network appliance, a blade computer, a server, etc. The cloud network 110 may comprise any suitable network for implementing embodiments of a cloud network, such as, one or more of a storage area network, a wide area network, the Internet, an intranet, etc.

The logical view 104 of the cloud network 110 includes the monitoring server 112 and a plurality of cloud images 114a . . . 114m that are present within the cloud network 116, where the monitoring server 112 corresponds to the monitoring server 106, and the cloud network 116 corresponds to the cloud network 110, and the cloud images 114a . . . 114m execute on the plurality of nodes 108a . . . 108n. In certain embodiments, the cloud images 114a . . . 114m may be over 30,000 in number, and each of the cloud images 114a . . . 114m may comprise a virtual machine (VM). A virtual machine is a software implementation of a machine (e.g., a computer) that executes programs like a physical machine.

In certain embodiments, at least 30,000 cloud images are maintained in the cloud environment 104 subsequent to the increase in the number of the plurality of cloud images in the cloud environment 104, where the monitoring server 112 is unable to directly monitor tasks executing on the numerous cloud images.

Therefore, FIG. 1 illustrates certain embodiments in which a very large number (e.g., over 30,000) cloud images 114a . . . 114m are found in a cloud network 116. Certain embodiments provide a mechanism by which the monitoring server 112 can monitor these very large number of cloud images, and also accommodate the contraction and expansion in the number of cloud images.

Figure 2:
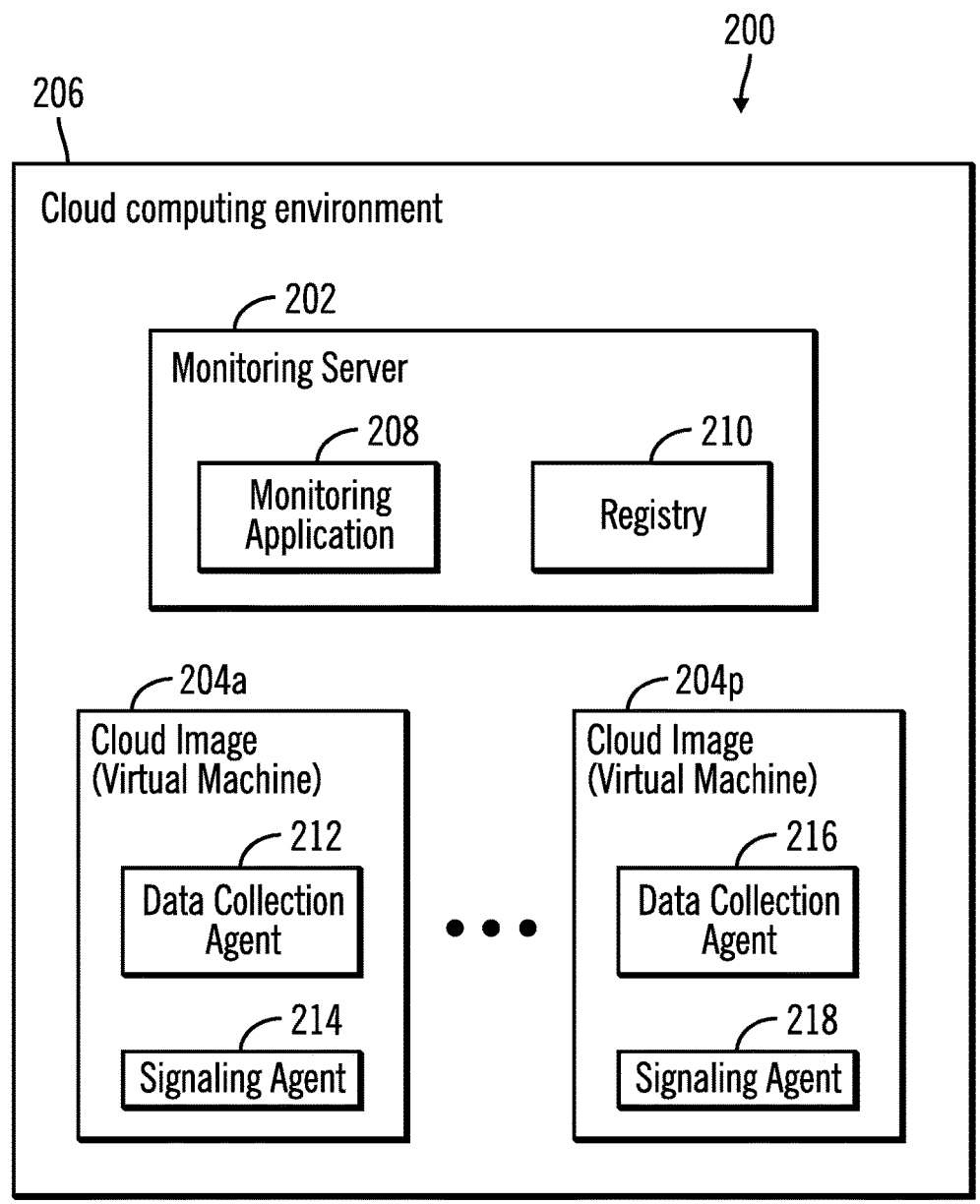
FIG. 2 illustrates a block diagram that shows a monitoring server and cloud images in the cloud computing environment, in accordance with certain embodiments.

FIG. 2 illustrates a block diagram 200 that shows a monitoring server 202 and a plurality of cloud images 204a . . . 204p in a cloud computing environment 206, in accordance with certain embodiments.

In certain embodiments, a monitoring application 208 executes within the monitoring server 202. The monitoring application 208 maintains the cloud images 204a . . . 204p by keeping track of the cloud images 204a . . . 204p in a registry 210, where the registry 210 is any suitable data structure.

Each of the cloud images 204a . . . 204p includes a data collection agent and a signaling agent, where data collection agents 212, 216 and signaling agents 214, 218 are shown in FIG. 2. In certain embodiments, the monitoring application 208, the data collection agents 212, 216, and the signaling agents 214, 218 may be implemented in software, firmware, hardware or any combination thereof.

In certain embodiments, the data collection agents and a signaling agents get deployed as part of a virtual machine's master image, i.e., every image in the cloud is a candidate to have deployed on it a monitoring agent and signaling agent.

The data collection agent 212, 216 is responsible for harvesting information about the cloud image (or applications on the cloud image) and providing the information to an external caller via an application programming interface (API). The signaling agent 214, 218 is used to signal a remote piece of code (e.g., the monitoring application 208) on the monitoring server 202 to indicate that the data collection agent is present on the cloud image.

In FIG. 2, the monitoring server 202 maintains a list of all cloud images that are currently available to be monitored, and adjusts this list as the cloud images expand (computer systems increase) and contract (computer systems decrease) in real-time. Such embodiments may successfully monitor extreme cloud environments, by using highly parallel task queuing, to monitor any number of computer systems and has the logic to keep track of nodes or images as they become available or unavailable.

Therefore, FIG. 2 illustrates certain embodiments in which a monitoring application 208 monitors execution of a large number of tasks in the cloud computing environment 206 with the assistance of data collection agents and signaling agents that execute in cloud images 204a . . . 204n.

Figure 3:
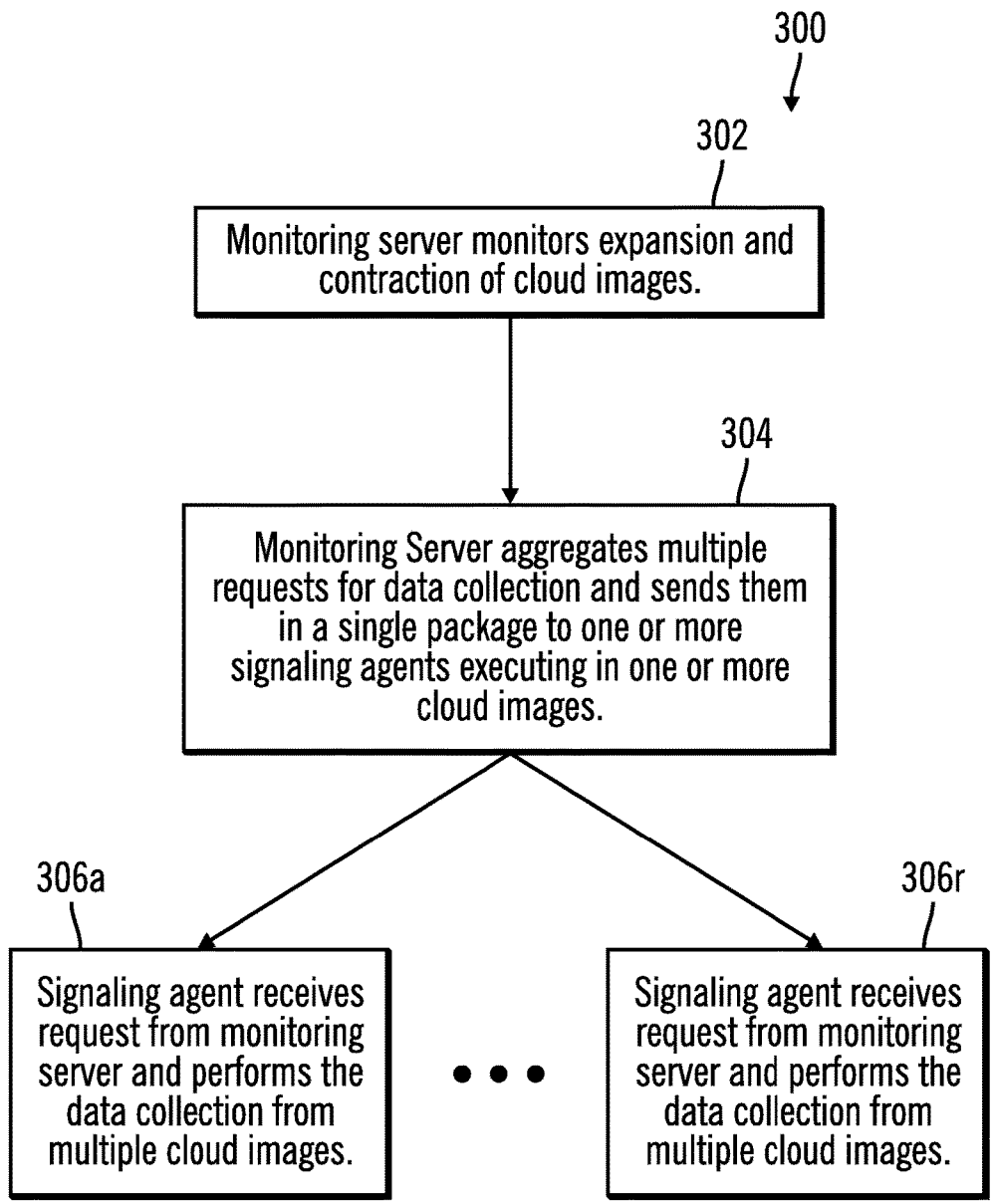
FIG. 3 illustrates a flowchart that shows operations performed by the monitoring server, and signaling agents that execute in the cloud images, in accordance with certain embodiments.

FIG. 3 illustrates a flowchart 300 that shows operations performed by the monitoring server 202, and signaling agents 212, 218 that execute in the cloud images 204a . . . 204p, in accordance with certain embodiments. The operations shown in FIG. 3 may be performed in the cloud computing environment 206.

Control starts at block 302 in which the monitoring server 202 monitors expansion and contraction of cloud images. The monitoring server 202 aggregates (at block 304) multiple requests for data collection and sends the multiple requests in a single package to one or more signaling agents 214, 218 executing in one or more cloud images 204a . . . 204p.

Control proceeds in parallel from block 304 to block 306a . . . 306r, in which the one or more signaling agents 214, 218 receive the single package from the monitoring server 202 and performs the data collection from multiple cloud images via one or more data collection agents.

Therefore, FIG. 3 illustrates certain embodiments in which the monitoring application 208 that executes in the cloud computing environment 208 aggregates multiple requests into a single request, and sends the single request to a signaling agent. As a result, the monitoring server 202 is able to reduce the number of requests to cloud images, and manage a larger number of cloud images in comparison to the situation where multiple requests not aggregated into a single request.

Figure 4:
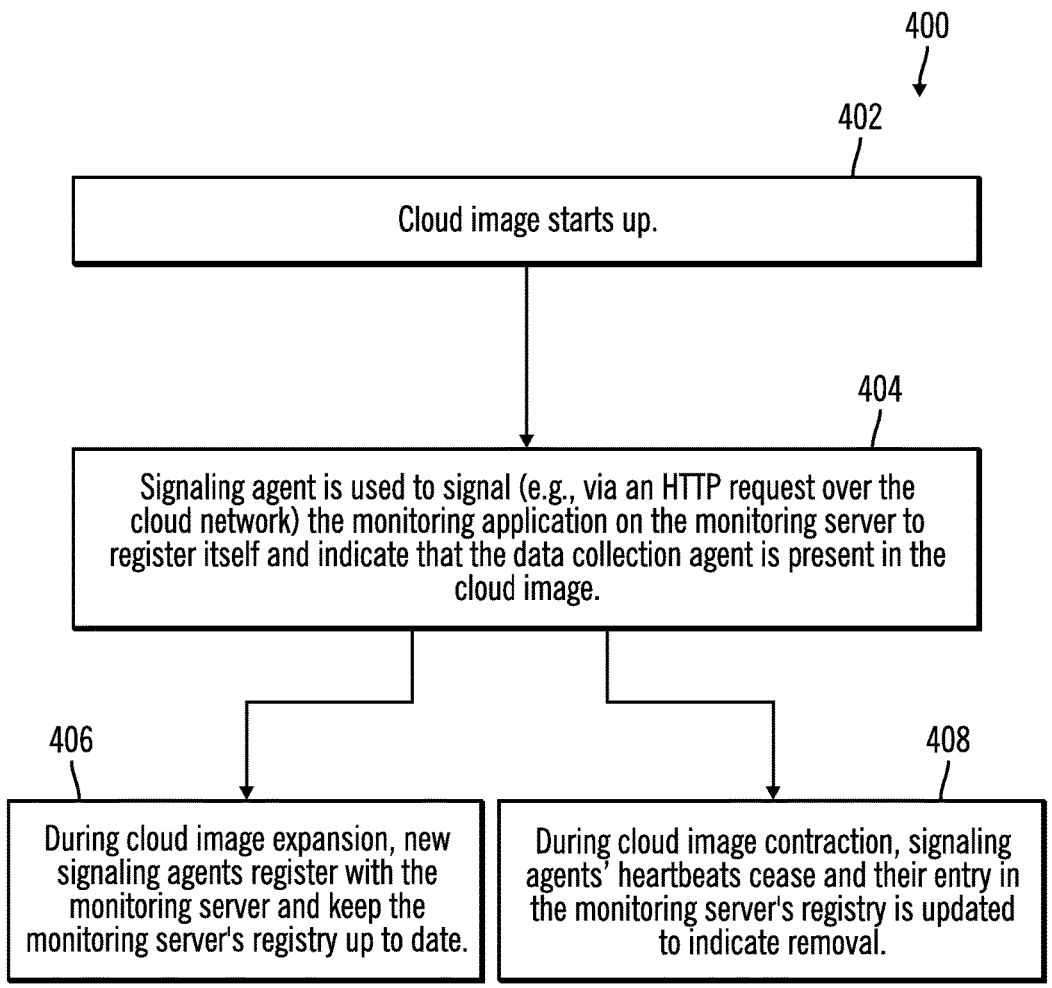
FIG. 4 illustrates a flowchart that shows operations related to cloud expansion and contraction, in accordance with certain embodiments.

FIG. 4 illustrates a flowchart 400 that shows operations related to cloud expansion and contraction, in accordance with certain embodiments. The operations shown in FIG. 4 may be performed in the cloud computing environment 206.

Control starts at block 402 in which the image in the cloud starts up. The signaling agent contacts (at block 404) the monitoring server 202 and registers itself and the fact that it has a data collection agent. The type of data collection agent, security and capabilities are part of the registration. As part of the signaling, a heartbeat is established with the monitoring server 202 to indicate that the cloud image is operational. Should the heartbeat cease, this would be an indication that the cloud image is no longer available and the data collection agent is to be removed from the monitoring server's registry 210.

As a cloud becomes more elastic (expands and contracts) signaling agents may increase in number or decrease in number. During expansion, new signaling agents register with the monitoring server 202 and as such, keep the monitoring server's registry 210 up to date (as shown via block 406). Should cloud images contract, then the disappearing signaling agents' heartbeat would cease and their entry in the monitoring server's registry 210 is updated (as shown via block 408).

Therefore, FIG. 4 shows a process that allows the monitoring server 202 to determine which cloud images are available for monitoring and which cloud images are not available for monitoring, at any instant of time. Thus, such embodiments allow the monitoring server 202 to be cloud enabled by allowing the monitoring server 202 to operate under cloud elasticity.

Figure 5:
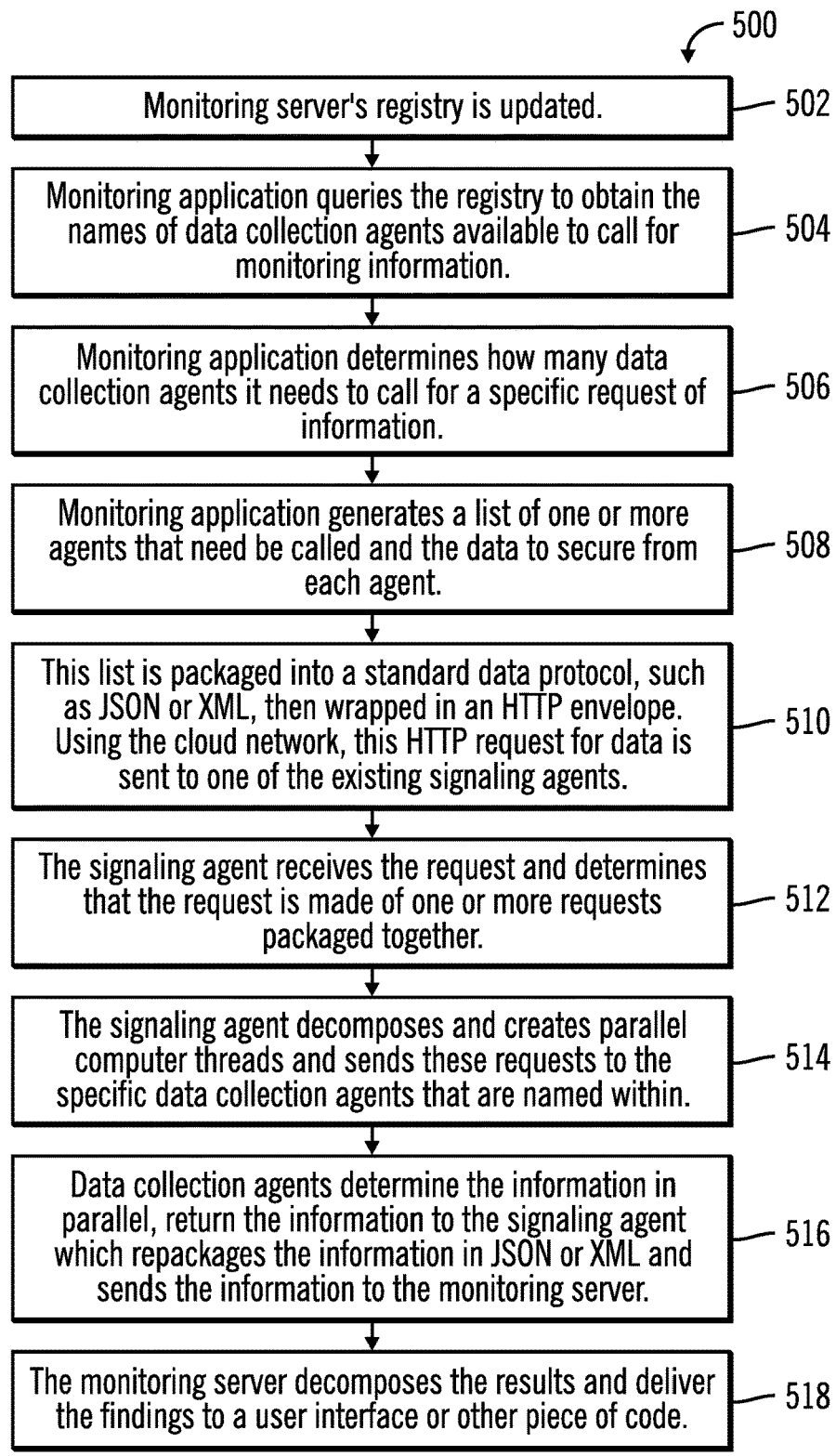
FIG. 5 illustrates a flowchart that shows first operations performed in the cloud environment, in accordance with certain embodiments.

FIG. 5 illustrates a flowchart 500 that shows first operations performed in the cloud computing environment 206, in accordance with certain embodiments.

Control starts at block 502 in which the monitoring server's registry 210 is updated. Once the monitoring server's registry 210 is updated, the monitoring application 208 queries (at block 504) the registry 210 to obtain the names of data collection agents available to call for monitoring information. The monitoring application 208 then determines (at block 506) how many data collection agents it needs to call for a specific request for information. The monitoring application 208 generates (at block 508) a list of one or more agents that need be called and the data to secure from each agent.

Control proceeds to block 510, where this list is packaged into a standard data protocol, such as JavaScript* Object Notation (JSON) or extensible markup language (XML), then wrapped in a hypertext transport protocol (HTTP) envelope or some other wrapping protocol. Using the cloud network, this HTTP request for data is sent to one of the existing signaling agents (selected either by round robin or load balancing techniques or some other technique).

*Java, JavaScript are trademarks or registered trademark of Oracle and/or its affiliates.

The selected signaling agent receives (at block 512) the request and determines that the request is made of one or more requests packaged together. At this point the signaling agent decomposes and creates parallel computer threads and sends these requests to the specific data collection agents that are named (at block 514). Data collection agents determine (at block 516) the information in parallel, and return the information to the signaling agent which repackages the information in JSON or XML and sends the information to the monitoring server 202. The monitoring server 202 decomposes (at block 518) the results and delivers the findings to a user interface (UI) or other piece of code.

The monitoring techniques of certain embodiments automatically scale up as cloud images expand and scales down as cloud images collapse. This occurs because the number of images where work queuing can take place increases and decreases as the cloud expands and collapses. For example, a cloud with 100 cloud images can queue onto 100 parallel queue points. Should the cloud suddenly expand to 100,000 cloud images, then up to 100,000 queue points may become available. Each queue point may then include one or more monitoring tasks that may be executed in parallel.

Additionally, by packaging many requests for data collection into a single HTTP request and by selecting a signaling agent to handle the parallel dispatch of this request, the monitoring server 202 off-loads work onto cloud images and uses the computing power of the cloud images to help in the data harvesting. This effectively creates a scaling model that naturally fits the cloud model. As the cloud expands there is an increase in the number of signaling agents and thus an increase in the queue points or places at which requests can run in parallel. As the cloud contracts there is a decrease in signaling agents as well as a decrease in the need for queue points for requests to run from. The scale dynamics of the monitoring is controlled by the cloud's needs and not the monitoring application's needs. As a result the scaling is non-intrusive from a monitoring perspective, and this type of scaling may be referred to as horizontal cloud scaling.

Figure 6:
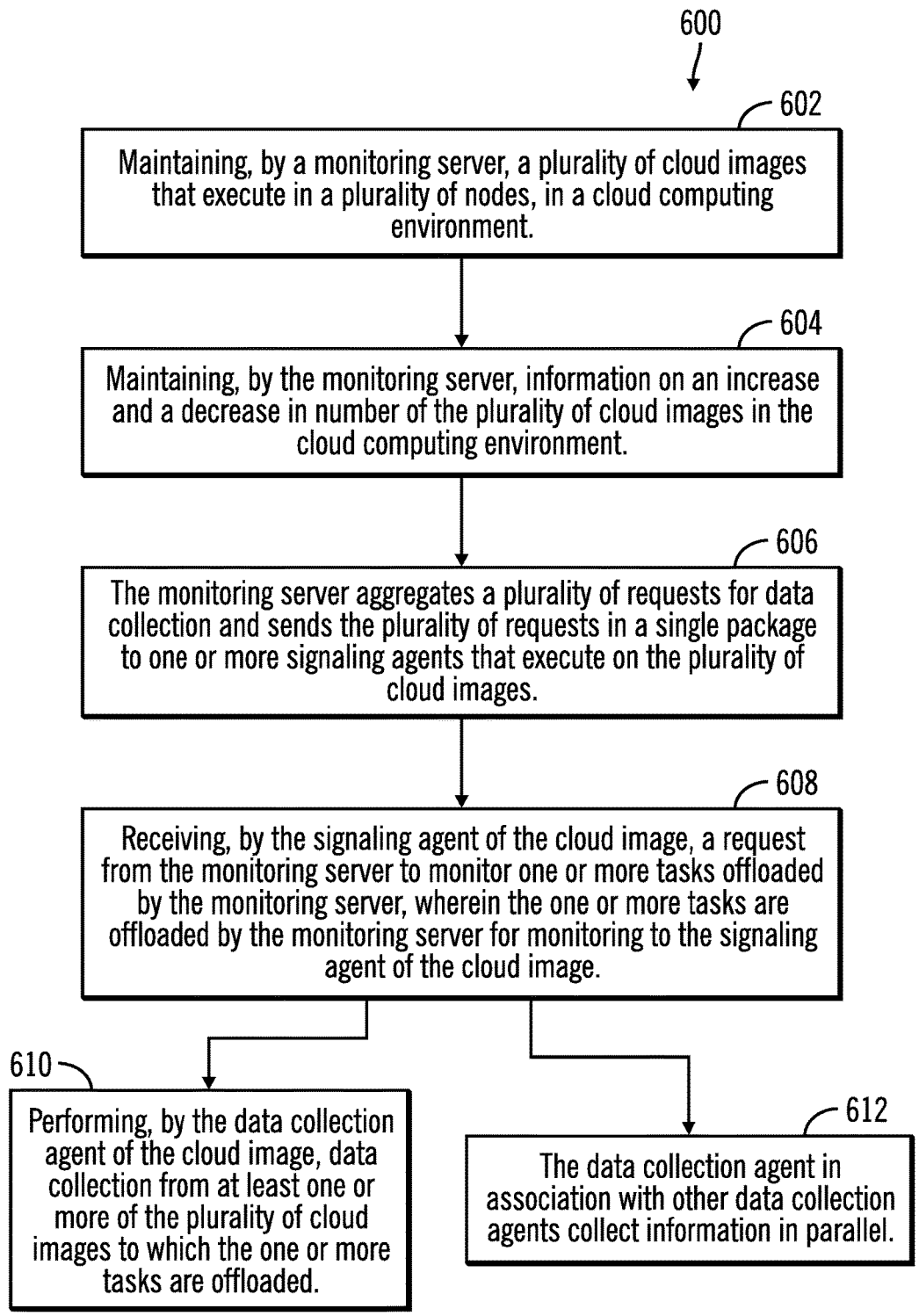
FIG. 6 illustrates a block diagram that shows second operations performed in the cloud environment, in accordance with certain embodiments.

FIG. 6 illustrates a flowchart 600 that shows first operations performed in the cloud computing environment, 206 in accordance with certain embodiments.

Control starts at block 602, in which a plurality of cloud images 204a . . . 204p that execute in a plurality of nodes are maintained by a monitoring server 202, in a cloud computing environment 206. The monitoring server 202 maintains (at block 604) information on an increase and a decrease in number of the plurality of cloud images in the cloud computing environment 206.

Control proceeds to block 606 in which, the monitoring server 202 aggregates a plurality of requests for data collection and sends the plurality of requests in a single package to one or more signaling agents 214, 218 that execute on the plurality of cloud images.

Control proceeds to block 608 which the signaling agent 214 of the cloud image 204a receives a request from the monitoring server 202 to monitor one or more tasks offloaded by the monitoring server 202, where the one or more tasks are offloaded by the monitoring server 202 for monitoring to the signaling agent 214 of the cloud image 204a.

From block 608, control may proceed to blocks 610, 612. At block 610, the data collection agent 212 of the cloud image 204a performs data collection from at least one or more of the plurality of cloud images to which the one or more tasks are offloaded. In certain embodiments, the data collection agent 212 in association with other data collection agents collect (at block 612) information in parallel on at least performance characteristics to report to a customer for the customer to allocate further tasks for execution in the cloud computing environment 206.

Figure 7:
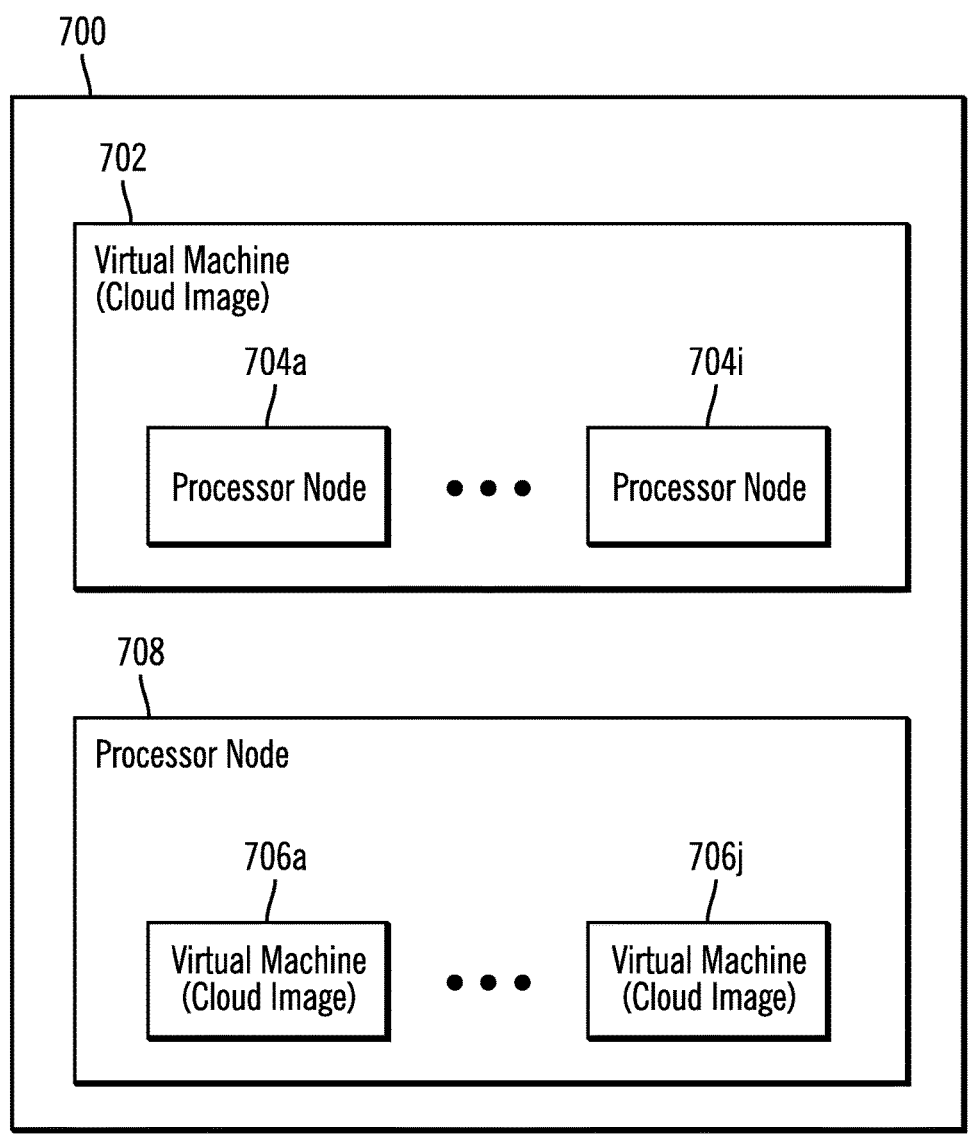
FIG. 7 illustrates a block diagram that shows selected types of execution of virtual machines, in accordance with certain embodiments.

FIG. 7 illustrates a block diagram 700 that shows selected types of execution of virtual machines, where the virtual machines are cloud images, in accordance with certain embodiments. In certain embodiments, a virtual machine 702 may execute on multiple processor nodes 704a . . . 704i, whereas in other embodiments a plurality of virtual machines 706a . . . 706j may execute in a single processor node 708.

Figure 8:
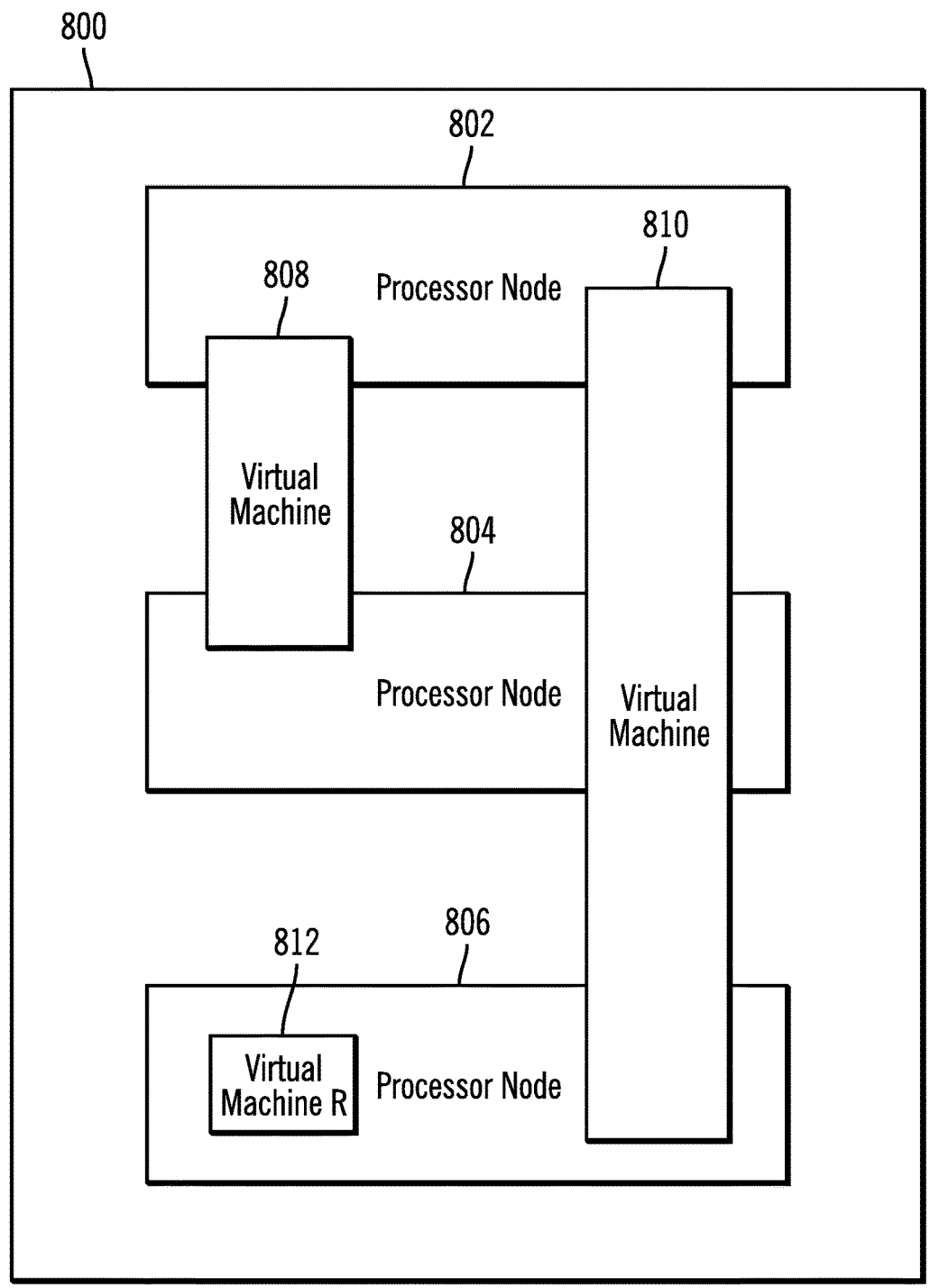
FIG. 8 illustrates a block diagram that shows additional selected types of execution of virtual machines, in accordance with certain embodiments.

FIG. 8 illustrates a block diagram 800 that shows additional selected types of execution of virtual machines, in accordance with certain embodiments. FIG. 8 shows three processor nodes 802, 804, 806 and three virtual machines 808, 810, 812. In certain embodiments, virtual machine 808 executes on processor nodes 802, 804, virtual machine 810 executes on processor nodes 802, 804, 806 and virtual machine 812 executes on processor node 806.

Therefore, FIGS. 7, 8 illustrate certain embodiments in which each of the plurality of cloud images is a virtual machine that executes on one or more of the plurality of nodes 108a . . . 108n of a cloud computing environment, and where one or more virtual machine execute on at least some nodes of the plurality of nodes.

Therefore, FIGS. 1-8 illustrate certain embodiments in which a monitoring server 202 monitors a cloud computing environment 206 by supporting cloud elasticity and by supporting dynamic scaling that allows more than 30,000 cloud images to be monitored at the same time.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
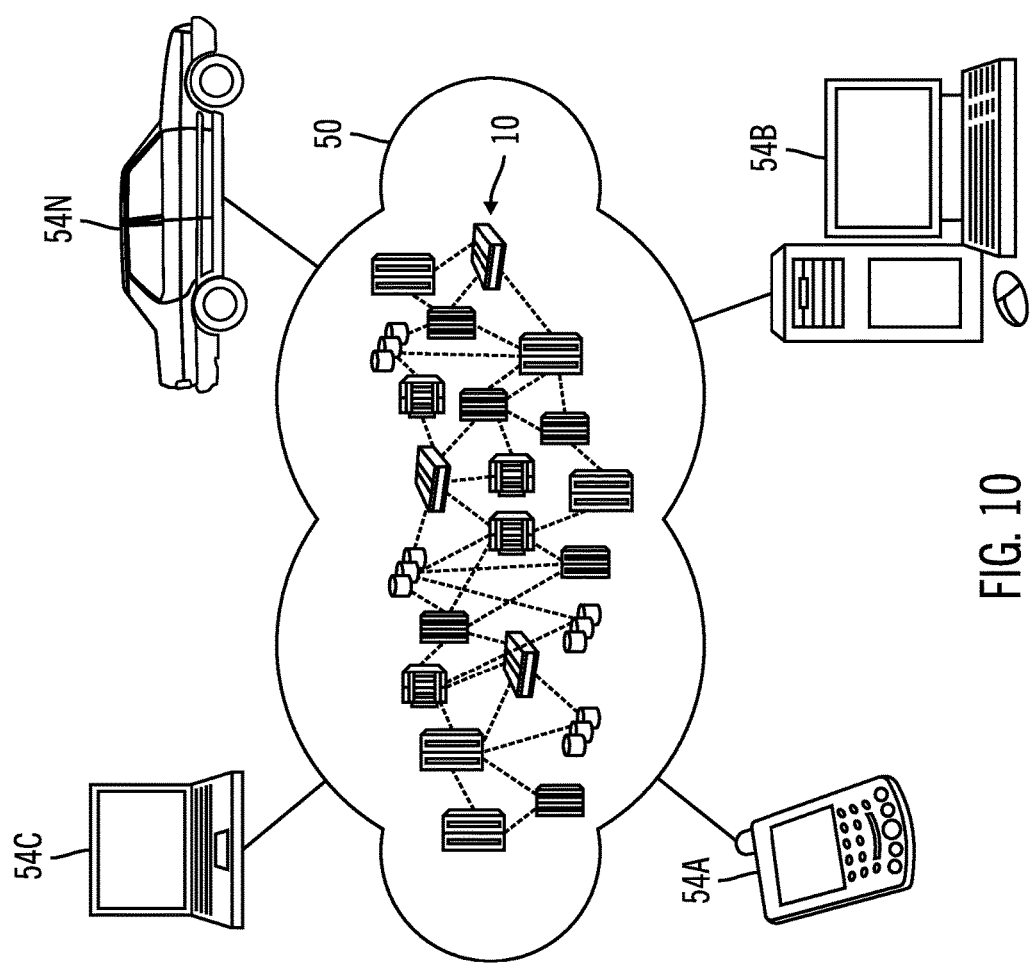
FIG. 10 illustrates a block diagram of a cloud computing environment, in accordance with certain embodiments.

Referring now to FIG. 10, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
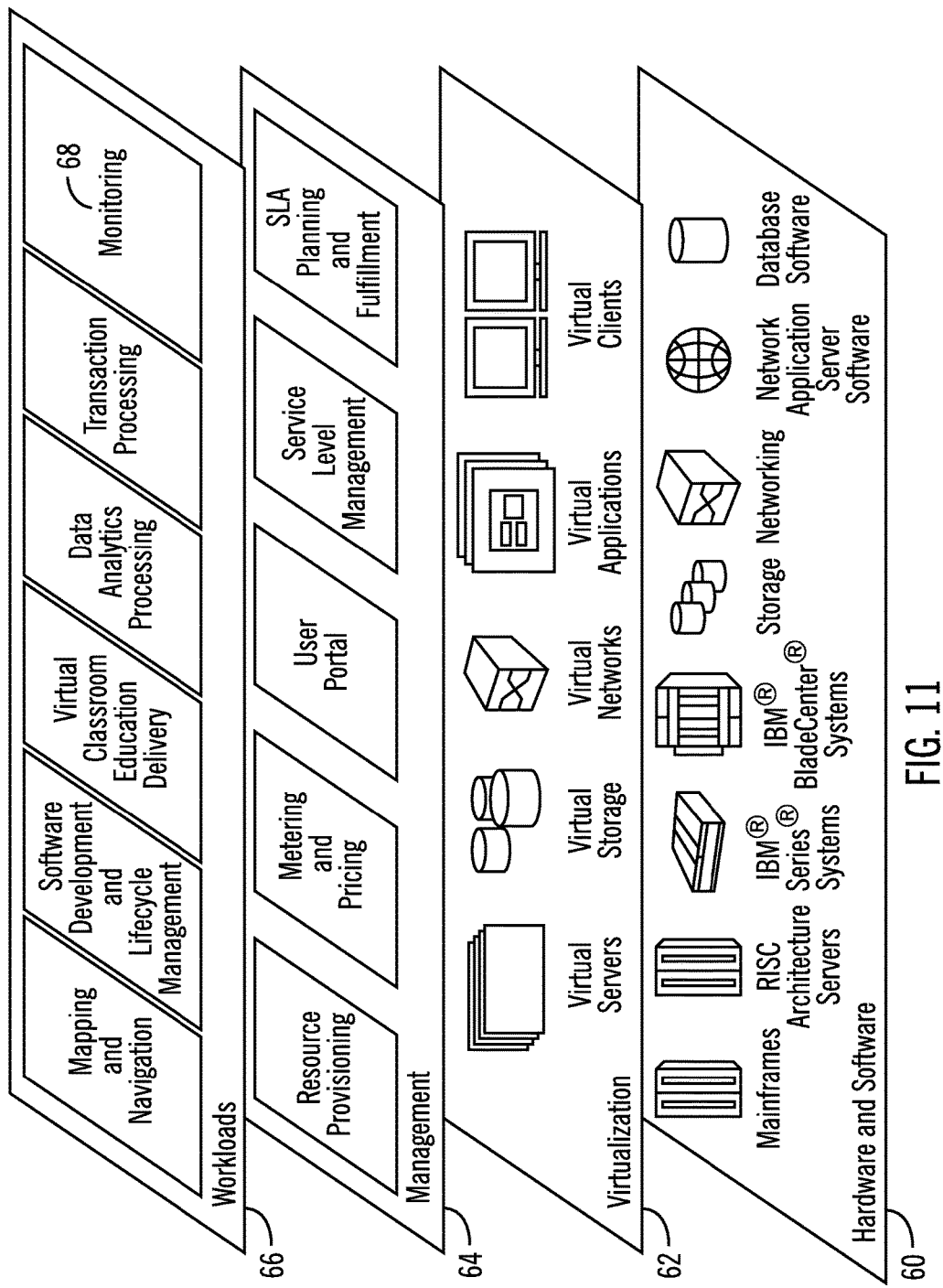
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and monitoring 68 of cloud images as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
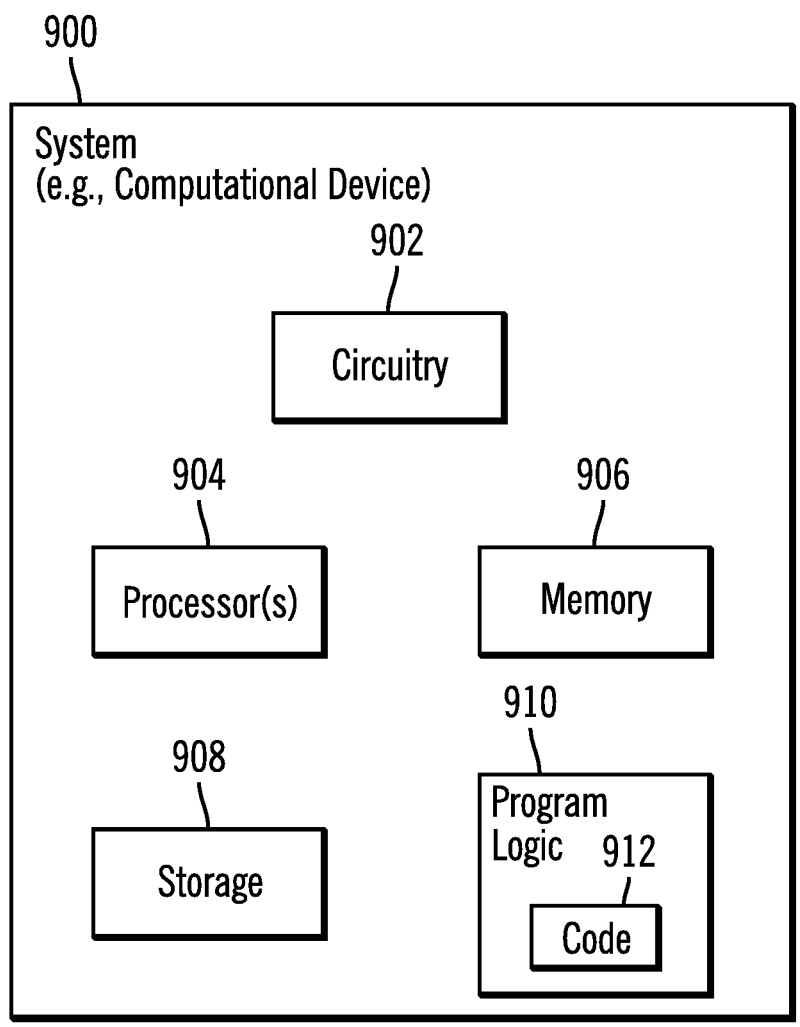
FIG. 9 illustrates a block diagram of a computational system that shows certain elements that may be included in the monitoring server or any of the nodes of FIG. 1, in accordance with certain embodiments.

FIG. 9 illustrates a block diagram that shows certain elements that may be included in the nodes (e.g. nodes 108a . . . 108n) or the monitoring server (e.g., 106) in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
a memory; and
a processor coupled to the memory, wherein the processor performs operations, the operations comprising:
tracking, by a monitoring server via a registry, a plurality of cloud images that execute in a plurality of nodes, in a cloud computing environment, wherein the monitoring server offloads tasks to one or more signaling agents of a plurality of signaling agents that are included in the plurality of cloud images, and wherein in response to a startup of a cloud image, a signaling agent of the cloud image registers the cloud image with the monitoring server and indicates to the monitoring server that a data collection agent is present in the cloud image;
updating the registry of the monitoring server with information on a change in number of the plurality of cloud images in the cloud computing environment;
in response to updating the registry of the monitoring server, querying by a monitoring application of the monitoring server, the registry to determine names of data collection agents available to call;
subsequent to determining the names of the data collection agents available to call, determining how many of the determined data collection agents that are available to call are needed by the monitoring application to call for a request for information;
generating a list of one or more data collection agents and packaging the list of one or more data collection agents in a wrapping protocol and sending the request for information to one signaling agent selected from the plurality of signaling agents via a round robin mechanism;
receiving, by the one signaling agent, the list and determining, by the one signaling agent that the request for information is made of one or more requests packaged together;
decomposing the list, and creating parallel threads to send the one or more requests to the one or more data collection agents named within the list; and
determining, by the one or more data collection agents, the information in parallel, and transmitting the information to the one signaling agent, wherein the one signaling agent repackages and sends the information transmitted by the one or more data collection agents to the monitoring server.

2. The system of claim 1, the operations further comprising: performing, by a data collection agent of a cloud image, data collection from at least one or more of the plurality of cloud images to which tasks are offloaded.

3. The system of claim 2, wherein the monitoring server aggregates a plurality of requests for data collection and sends the plurality of requests in a single package to the one or more signaling agents that execute on the plurality of cloud images.

4. The system of claim 2, wherein the data collection agent in association with other data collection agents collect information in parallel on at least performance characteristics to report to a customer for the customer to allocate further tasks for execution in the cloud computing environment.

5. The system of claim 1, wherein each of the plurality of cloud images is a virtual machine that executes on one or more of the plurality of nodes of the cloud computing environment, and wherein one or more virtual machine execute on at least some nodes of the plurality of nodes.

6. A computer program product, the computer program product comprising:
a non-transitory computer readable storage medium having computer readable program code embodied therewith, the computer readable program code configured to perform operations on a processor, the operations comprising:
tracking, by a monitoring server via a registry, a plurality of cloud images that execute in a plurality of nodes, in a cloud computing environment, wherein the monitoring server offloads tasks to one or more signaling agents of a plurality of signaling agents that are included in the plurality of cloud images, and wherein in response to a startup of a cloud image, a signaling agent of the cloud image registers the cloud image with the monitoring server and indicates to the monitoring server that a data collection agent is present in the cloud image;
updating the registry of the monitoring server with information on a change in number of the plurality of cloud images in the cloud computing environment;
in response to updating the registry of the monitoring server, querying by a monitoring application of the monitoring server, the registry to determine names of data collection agents available to call;

subsequent to determining the names of the data collection agents available to call, determining how many of the determined data collection agents that are available to call are needed by the monitoring application to call for a request for information;

generating a list of one or more data collection agents and packaging the list of one or more data collection agents in a wrapping protocol and sending the request for information to one signaling agent selected from the plurality of signaling agents via a round robin mechanism;

receiving, by the one signaling agent, the list and determining, by the one signaling agent that the request for information is made of one or more requests packaged together;

decomposing the list, and creating parallel threads to send the one or more requests to the one or more data collection agents named within the list; and determining, by the one or more data collection agents, the information in parallel, and transmitting the information to the one signaling agent, wherein the one signaling agent repackages and sends the information transmitted by the one or more data collection agents to the monitoring server.

7. The computer program product of claim 6, the operations further comprising: performing, by a data collection agent of a cloud image, data collection from at least one or more of the plurality of cloud images to which tasks are offloaded.

8. The computer program product of claim 7, wherein the monitoring server aggregates a plurality of requests for data collection and sends the plurality of requests in a single package to the one or more signaling agents that execute on the plurality of cloud images.

9. The computer program product of claim 7, wherein the data collection agent in association with other data collection agents collect information in parallel on at least performance characteristics to report to a customer for the customer to allocate further tasks for execution in the cloud computing environment.

10. The system of claim 1, the operations further comprising: during cloud image expansion new signaling agents register with the monitoring server and keep a registry of the monitoring server up to date.

11. The system of claim 10, the operations further comprising: during cloud image contraction heartbeats of selected signaling agents cease and an entry of the selected signaling agents in the registry of the monitoring server is updated to indicate removal of the selected signaling agents.

12. The system of claim 11, wherein a set of signaling agents create parallel threads to send requests to data collection agents indicated by the monitoring server to the set of signaling agents.

13. The computer program product of claim 6, the operations further comprising: during cloud image expansion new signaling agents register with the monitoring server and keep a registry of the monitoring server up to date.

14. The computer program product of claim 13, the operations further comprising: during cloud image contraction heartbeats of selected signaling agents cease and an entry of the selected signaling agents in the registry of the monitoring server is updated to indicate removal of the selected signaling agents.

15. The computer program product of claim 14, wherein a set of signaling agents create parallel threads to send requests to data collection agents indicated by the monitoring server to the set of signaling agents.

16. The system of claim 1, wherein a type of the data collection agent, security, and capabilities are indicated while a cloud image registers the cloud image with the monitoring server, wherein each of the plurality of cloud images is a virtual machine that includes at least one signaling agent and at least one data collection agent, wherein the at least one signaling agent and the at least one data collection agent are deployed as part of master image of the virtual machine.

17. The computer program product of claim 6, wherein a type of the data collection agent, security, and capabilities are indicated while a cloud image registers the cloud image with the monitoring server, wherein each of the plurality of cloud images is a virtual machine that includes at least one signaling agent and at least one data collection agent, wherein the at least one signaling agent and the at least one data collection agent are deployed as part of a master image of the virtual machine.

* * * * *